US012680004B2

(12) United States Patent
Yamasaki et al.

(10) Patent No.: US 12,680,004 B2
(45) Date of Patent: Jul. 14, 2026

(54) PRESSURE SENSITIVE ADHESIVE, TONER FOR DEVELOPING ELECTROSTATIC CHARGE IMAGE, METHOD FOR PRODUCING PRESSURE SENSITIVE ADHESIVE, METHOD FOR PRODUCING TONER FOR DEVELOPING ELECTROSTATIC CHARGE IMAGE, AND BONDED PRODUCT

(71) Applicant: FUJIFILM Business Innovation Corp., Tokyo (JP)

(72) Inventors: Sumiaki Yamasaki, Kanagawa (JP); Kiyohiro Yamanaka, Kanagawa (JP); Satoshi Kamiwaki, Kanagawa (JP); Takahiro Ishizuka, Kanagawa (JP); Yasunobu Kashima, Kanagawa (JP); Satoshi Inoue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/506,064

(22) Filed: Oct. 20, 2021

(65) Prior Publication Data

US 2022/0306905 A1     Sep. 29, 2022

(30) Foreign Application Priority Data

Mar. 26, 2021     (JP) ................................. 2021-054290

(51) Int. Cl.

| | |
|---|---|
| *C09J 7/38* | (2018.01) |
| *C08F 212/08* | (2006.01) |
| *C08F 257/02* | (2006.01) |
| *C08L 25/14* | (2006.01) |
| *C09J 5/00* | (2006.01) |
| *C09J 125/14* | (2006.01) |
| *C09J 133/08* | (2006.01) |
| *C09J 133/10* | (2006.01) |
| *G03G 9/08* | (2006.01) |

(52) U.S. Cl.
CPC ................. *C09J 7/38* (2018.01); *C09J 7/385* (2018.01); *C09J 125/14* (2013.01); *C09J 133/08* (2013.01); *C09J 133/10* (2013.01); *G03G 9/0823* (2013.01); *C08L 2207/53* (2013.01); *C09J 2301/302* (2020.08); *C09J 2301/312* (2020.08)

(58) Field of Classification Search
CPC ... C09J 7/38; C09J 7/385; C09J 125/14; C09J 133/08; C09J 133/10; C08F 212/08; C08F 220/1804; C08F 220/06; C08F 257/02; C08F 220/1808; C08F 222/102; C08L 25/14; C08L 33/08; C08L 51/003; C09D 125/14; G03G 9/08797
See application file for complete search history.

(56) References Cited

U.S. PATENT DOCUMENTS

| | | | |
|---|---|---|---|
| 2003/0003387 A1 | 1/2003 | Xu et al. | |
| 2010/0330354 A1* | 12/2010 | Tsukagoshi | ............... C09J 7/22 |
| | | | 428/220 |
| 2013/0184393 A1* | 7/2013 | Satrijo | .................... C08L 33/04 |
| | | | 524/561 |
| 2019/0292412 A1* | 9/2019 | Yamasaki | .................. C09J 4/06 |
| 2019/0390091 A1 | 12/2019 | Gerst et al. | |

FOREIGN PATENT DOCUMENTS

| | | |
|---|---|---|
| EP | 1808733 A1 | 7/2007 |
| JP | 2010-97000 A | 4/2010 |
| JP | 2021017465 A * | 2/2021 |

OTHER PUBLICATIONS

Machine translation into English of JP-2021017465-A; Ishizuka. (Year: 2021).*
Extended European Search Report dated May 9, 2022 in Application No. 21211714.7.
Communication issued Apr. 1, 2025 in Japanese Application No. 2021-054290.
Communication issued Dec. 19, 2025 in European Application No. 21 211 714.7.
Communication issued May 1, 2026 in Chinese Application No. 2021-11513406.6.

* cited by examiner

*Primary Examiner* — Karuna P Reddy
(74) *Attorney, Agent, or Firm* — Sughrue Mion, PLLC

(57)     ABSTRACT

A pressure sensitive adhesive includes: composite resin particles that contain a styrene resin containing, as polymerization components, styrene and a vinyl monomer other than styrene, and a (meth)acrylate resin containing, as a polymerization component, a (meth)acrylate; and an aqueous solvent containing water, in which a mass ratio of the styrene resin to the (meth)acrylate resin (styrene resin: (meth)acrylate resin) is 80:20 to 20:80, a difference between the lowest glass transition temperature and the highest glass transition temperature of the composite resin particles is 30° C. or more, a melt viscosity of the composite resin particles at 100° C. is 4000 Pa·s or more and 20000 Pa·s or less, and, in a melt viscosity range of the composite resin particles of 4000 Pa·s or more and 20000 Pa·s or less, a slope of a logarithm of the melt viscosity of the composite resin particles relative to a temperature of the composite resin particles is −0.08 or more and −0.04 or less.

6 Claims, No Drawings

PRESSURE SENSITIVE ADHESIVE, TONER FOR DEVELOPING ELECTROSTATIC CHARGE IMAGE, METHOD FOR PRODUCING PRESSURE SENSITIVE ADHESIVE, METHOD FOR PRODUCING TONER FOR DEVELOPING ELECTROSTATIC CHARGE IMAGE, AND BONDED PRODUCT

CROSS-REFERENCE TO RELATED APPLICATIONS

This application is based on and claims priority under 35 USC 119 from Japanese Patent Application No. 2021-054290 filed Mar. 26, 2021.

BACKGROUND

(i) Technical Field

The present disclosure relates to a pressure sensitive adhesive, a toner for developing an electrostatic charge image, a method for producing a pressure sensitive adhesive, a method for producing a toner for developing an electrostatic charge image, and a bonded product.

(ii) Related Art

Japanese Unexamined Patent Application Publication No. 2021-017465 proposes an adhesive material that contains a styrene resin containing, as polymerization components, styrene and a vinyl monomer other than styrene, and a (meth)acrylate resin containing, as polymerization components, at least two (meth)acrylates that account for 90 mass % or more of all polymerization components of the (meth) acrylate resin, in which the mass ratio of the styrene resin to the (meth)acrylate resin is 80:20 to 20:80, and the adhesive material contains resin particles that have at least two glass transition temperatures, the lowest one of which is −30° C. or lower and the highest one of which is 30° C. or higher.

SUMMARY

Aspects of non-limiting embodiments of the present disclosure relate to a pressure sensitive adhesive including composite resin particles that contain a styrene resin containing, as polymerization components, styrene and a vinyl monomer other than styrene, and a (meth)acrylate resin containing, as a polymerization component, a (meth)acrylate; and an aqueous solvent containing water, in which a mass ratio of the styrene resin to the (meth)acrylate resin (styrene resin:(meth)acrylate resin) is 80:20 to 20:80 and in which a difference between the lowest glass transition temperature and the highest glass transition temperature of the composite resin particles is 30° C. or more, and this pressure sensitive adhesive exhibits excellent adhesiveness and releasing properties even when the pressure sensitive adhesive is used to bond thin recording media, and less contaminates a pressure bonding apparatus used in bonding the thin recording media compared to when the melt viscosity of the composite resin particles at 100° C. is less than 4000 Pa·s or more than 20000 Pa·s, and compared to when, in a melt viscosity range of the composite resin particles of 4000 Pa·s or more and 20000 Pa·s or less, the slope of a logarithm of the melt viscosity of the composite resin particles relative to a temperature of the composite resin particles is less than −0.08 or more than −0.04.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a pressure sensitive adhesive including: composite resin particles that contain a styrene resin containing, as polymerization components, styrene and a vinyl monomer other than styrene, and a (meth)acrylate resin containing, as a polymerization component, a (meth)acrylate; and an aqueous solvent containing water, in which a mass ratio of the styrene resin to the (meth)acrylate resin (styrene resin:(meth)acrylate resin) is 80:20 to 20:80, a difference between the lowest glass transition temperature and the highest glass transition temperature of the composite resin particles is 30° C. or more, a melt viscosity of the composite resin particles at 100° C. is 4000 Pa·s or more and 20000 Pa·s or less, and, in a melt viscosity range of the composite resin particles of 4000 Pa·s or more and 20000 Pa·s or less, a slope of a logarithm of the melt viscosity of the composite resin particles relative to a temperature of the composite resin particles is −0.08 or more and −0.04 or less.

DETAILED DESCRIPTION

Exemplary embodiments, which are some of the examples of the present disclosure, will now be described. These descriptions and examples are merely illustrative and do not limit the scope of the present disclosure.

In this description, in numerical ranges described stepwise, the upper limit or the lower limit of one numerical range may be substituted with an upper limit or a lower limit of a different numerical range also described stepwise. In addition, in any numerical range described in the description, the upper limit or the lower limit of the numerical range may be substituted with a value indicated in Examples.

Each component may contain more than one corresponding substances.

When the amount of a component in a composition is described and when there are two or more substances that correspond to that component in the composition, the amount is the total amount of the two or more substances in the composition unless otherwise noted.

In this description, a numerical range that uses "to" indicates a range that includes a figure that precedes "to" and a figure that follows "to" as the minimum value and the maximum value, respectively.

In this description, the term "step" indicates not only an independent step but also any feature that achieves the intended purpose of a certain step although such a feature may not be clearly distinguishable from other steps.

Pressure Sensitive Adhesive

A pressure sensitive adhesive according to an exemplary embodiment contains: composite resin particles that contain a styrene resin containing, as polymerization components, styrene and a vinyl monomer other than styrene, and a (meth)acrylate resin containing, as a polymerization component, a (meth)acrylate; and an aqueous solvent that contains water.

In addition, the following requirements are satisfied.

The mass ratio of the styrene resin to the (meth)acrylate resin (styrene resin:(meth)acrylate resin) is 80:20 to 20:80.

The difference between the lowest glass transition temperature and the highest glass transition temperature of the composite resin particles is 30° C. or more.

The composite resin particles have a melt viscosity of 4000 Pa·s or more and 20000 Pa·s or less at 100° C.

In the melt viscosity range of the composite resin particles of 4000 Pa·s or more and 20000 Pa·s or less, the slope of the logarithm of the melt viscosity of the composite resin particles relative to the temperature of the composite resin particles is −0.08 or more and −0.04 or less.

Because of the aforementioned features, the pressure sensitive adhesive according to this exemplary embodiment exhibits excellent adhesiveness and releasing properties even when the pressure sensitive adhesive is used to bond thin recording media (for example, thin paper having a basis weight of 82 gsm, hereinafter also referred to as thin paper sheets), and less contaminates a pressure bonding apparatus used in bonding the thin recording media. The reasons for this are presumably as follows.

For example, a pressure sensitive adhesive that contains: composite resin particles that contain a styrene resin containing, as polymerization components, styrene and a vinyl monomer other than styrene, and a (meth)acrylate resin containing, as a polymerization component, a (meth)acrylate; and an aqueous solvent that contains water, in which the mass ratio of the styrene resin to the (meth)acrylate resin (styrene resin:(meth)acrylate resin) is 80:20 to 20:80, and the difference between the lowest glass and the highest glass transition temperatures of the composite resin particles is 30° C. or more, can bond paper sheets to each other by applying the pressure sensitive adhesive to the paper sheets, bringing the paper sheets into contact with each other with the applied surface facing inside, and applying pressure by using a pressure bonding apparatus. However, this pressure sensitive adhesive sometimes exhibits insufficient adhesiveness and releasing properties when the sheets to be bonded are thin paper sheets. In other words, when bonding thin paper sheets to each other, due to a small thickness of the paper, the pressure from the pressure bonding apparatus does not sufficiently act, and bonding of the paper sheets tends to be insufficient. In addition, since thin paper sheets have low strength, when separating bonded paper sheets from each other, the paper sheets are prone to tearing and insufficient release.

Moreover, when thin paper sheets are bonded, the thin paper sheets tend to crinkle after application of the pressure sensitive adhesive. Thus, bonding of the paper sheets needs to take place immediately after the application of the pressure sensitive adhesive; however, in doing so, the pressure sensitive adhesive tends to adhere to the pressure bonding apparatus and contaminate the pressure bonding apparatus.

In the pressure sensitive adhesive of this exemplary embodiment, the composite resin particles have a melt viscosity of 4000 Pa·s or more and 20000 Pa·s or less at 100° C. Setting the melt viscosity at 100° C. to 4000 Pa·s or more improves the elasticity of the composite resin particles, and the composite resin particles easily deform when pressure is applied to bond thin paper sheets. Thus, even when the sheets to be bonded are thin paper sheets, the sheets easily bond to each other and adhesiveness is improved. Furthermore, setting the melt viscosity at 100° C. to 20000 Pa·s or less inhibits excessive improvement of adhesiveness, and thus, even when the sheets that are bonded are thin paper sheets, the load acting on the paper during release does not increase excessively, and thus tearing of paper and other issues are suppressed. Thus, even when the sheets that are bonded are thin paper sheets, excellent releasing properties are exhibited.

Furthermore, according to the pressure sensitive adhesive of this exemplary embodiment, in the melt viscosity range of the composite resin particles of 4000 Pa·s or more and 20000 Pa·s or less, the slope of the logarithm of the melt viscosity of the composite resin particles relative to the temperature of the composite resin particles is −0.08 or more and −0.04 or less. Setting the slope to −0.08 or more and −0.04 or less increases the speed in which the composite resin particles melt or undergo solidification transition during bonding of the paper sheets. This allows the paper sheets to bond to each other quicker. Thus, when bonding the thin paper sheets, the pressure sensitive adhesive rarely adheres to the pressure bonding apparatus, and contamination of the pressure bonding apparatus is thus suppressed.

Presumably due to the aforementioned reasons, the pressure sensitive adhesive according to this exemplary embodiment exhibits excellent adhesiveness and releasing properties even when the pressure sensitive adhesive is used to bond thin paper sheets, and less contaminates the pressure bonding apparatus used in bonding the thin paper sheets.

Composite Resin Particles

The composite resin particles contain a styrene resin containing, as polymerization components, styrene and a vinyl monomer other than styrene, and a (meth)acrylate resin containing, as a polymerization component, a (meth)acrylate.

The composite resin particles have a pressure-induced phase transition property.

Here, "have a pressure-induced phase transition property" means that the following formula 1 is satisfied.

$$10° \text{ C.} \le T1 - T2 \qquad \text{Formula 1:}$$

In formula 1, T1 represents a temperature at which the viscosity is 10000 Pa·s at a pressure of 1 MPa, and T2 represents a temperature at which the viscosity is 10000 Pa·s at a pressure of 10 MPa.

The method for determining the temperature T1 and the temperature T2 is as follows.

A substance to be measured is compressed into a pellet-shaped sample. The pellet-shaped sample is placed in a Flowtester (CFT-500 produced by Shimadzu Corporation), the applied pressure is fixed at 1 MPa, and the viscosity at 1 MPa relative to the temperature is measured. From the obtained viscosity graph, the temperature T1 at which the viscosity is $10^4$ Pa·s at an applied pressure of 1 MPa is determined. The temperature T2 is determined by the same method for determining the temperature T1 except that the applied pressure is changed from 1 MPa to 10 MPa.

Styrene Resin

The styrene resin contains, as polymerization components, styrene and a vinyl monomer other than styrene.

From the viewpoint of suppressing fluidization of the composite resin particles in an unpressured state, the mass ratio of styrene relative to the total of the polymerization components of the styrene resin is preferably 60 mass % or more, more preferably 70 mass % or more, and yet more preferably 75 mass % or more. From the viewpoint of forming composite resin particles that easily undergo phase transition under pressure, the mass ratio is preferably 95 mass % or less, more preferably 90 mass % or less, and yet more preferably 85 mass % or less.

Examples of the styrene monomers other than styrene include vinyl naphthalene; alkyl-substituted styrenes such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; aryl-substituted styrenes such as p-phenylstyrene; alkoxy-substituted styrenes such as p-methoxystyrene; halogen-substituted styrenes such as p-chlorostyrene, 3,4-dichlorostyrene, p-fluorostyrene, and 2,5-difluorostyrene; and nitro-substituted styrenes such as m-nitrostyrene, o-nitrostyrene, and p-nitrostyrene. These styrene monomers may be used alone or in combination.

The acryl monomer may be at least one acryl monomer selected from the group consisting of (meth)acrylic acid and (meth)acrylates. Examples of the (meth)acrylates include alkyl (meth)acrylates, carboxy-substituted alkyl (meth)acrylates, hydroxy-substituted alkyl (meth)acrylates, alkoxy-substituted alkyl (meth)acrylates, and di(meth)acrylates. These acryl monomers may be used alone or in combination.

Examples of the alkyl (meth)acrylates include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth) acrylate, lauryl (meth)acrylate, stearyl (meth)acrylate, cyclohexyl (meth)acrylate, dicyclopentanyl (meth)acrylate, and isobornyl (meth)acrylate.

An example of the carboxy-substituted alkyl (meth)acrylates is 2-carboxylethyl (meth)acrylate.

Examples of the hydroxy-substituted alkyl (meth)acrylates include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

An example of the alkoxy-substituted alkyl (meth)acrylates is 2-methoxyethyl (meth)acrylate.

Examples of the di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth) acrylate, nonanediol di(meth)acrylate, and decanediol di(meth)acrylate.

Examples of the (meth)acrylates also include 2-(diethylamino)ethyl (meth)acrylate, benzyl (meth)acrylate, and methoxypolyethylene glycol (meth)acrylate.

Examples of other vinyl monomer constituting the styrene resin include, in addition to the styrene monomers and acryl monomers, (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefines such as isoprene, butene, and butadiene.

From the viewpoint of forming a pressure sensitive adhesive that exhibits excellent adhesiveness and releasing properties even when the sheets to be bonded are thin and that less contaminates the pressure bonding apparatus used to bond thin paper sheets, the styrene resin preferably contains, as a vinyl monomer other than styrene, a (meth)acrylate, more preferably an alkyl (meth)acrylate, yet more preferably an alkyl (meth)acrylate in which the alkyl group contains 2 to 10 carbon atoms, still more preferably an alkyl (meth) acrylate in which the alkyl group contains 4 to 8 carbon atoms, and particularly preferably at least one of n-butyl acrylate and 2-ethylhexyl acrylate. The styrene resin and the (meth)acrylate resin may contain the same (meth)acrylate as a polymerization component.

From the viewpoint of suppressing fluidization of the composite resin particles in an unpressured state, the mass ratio of the (meth)acrylate relative to the total of the polymerization components of the styrene resin is preferably 40 mass % or less, more preferably 30 mass % or less, and yet more preferably 25 mass % or less. From the viewpoint of forming composite resin particles that easily undergo phase transition under pressure, the mass ratio is preferably 5 mass % or more, more preferably 10 mass % or more, and yet more preferably 15 mass % or more. The (meth)acrylate here is preferably an alkyl (meth)acrylate, yet more preferably an alkyl (meth)acrylate in which the alkyl group contains 2 or more and 10 or less carbon atoms, and still more preferably an alkyl (meth)acrylate in which the alkyl group contains 4 or more and 8 or less carbon atoms.

The styrene resin particularly preferably contains, as a polymerization component, at least one of n-butyl acrylate and 2-ethylhexyl acrylate, and the total amount of n-butyl acrylate and 2-ethylhexyl acrylate relative to the total of the polymerization components of the styrene resin is preferably 40 mass % or less, more preferably 30 mass % or less, and yet more preferably 25 mass % or less from the viewpoint of suppressing fluidization of the composite resin particles in an unpressured state. From the viewpoint of forming composite resin particles that easily undergo phase transition under pressure, the total amount is preferably 5 mass % or more, more preferably 10 mass % or more, and yet more preferably 15 mass % or more.

From the viewpoint of suppressing fluidization of the composite resin particles in an unpressured state, the weight average molecular weight of the styrene resin is preferably 3000 or more, more preferably 4000 or more, and yet more preferably 5000 or more. From the viewpoint of forming composite resin particles that easily undergo phase transition under pressure, the weight average molecular weight is preferably 50000 or less, more preferably 45000 or less, and yet more preferably 40000 or less.

In the present disclosure, the weight average molecular weight of a resin is measured by gel permeation chromatography (GPC). The molecular weight measurement by GPC involves using HLC-8120GPC produced by TOSOH CORPORATION as a GPC instrument with columns, TSK-gel Super HM-M (15 cm) produced by TOSOH CORPORATION, and tetrahydrofuran as a solvent. The weight average molecular weight of a resin is calculated by using a molecular weight calibration curve prepared by using monodisperse polystyrene standard samples.

From the viewpoint of suppressing fluidization of the composite resin particles in an unpressured state, the glass transition temperature of the styrene resin is preferably 30° C. or higher, more preferably 40° C. or higher, and yet more preferably 50° C. or higher. From the viewpoint of forming composite resin particles that easily undergo phase transition under pressure, the glass transition temperature is preferably 110° C. or lower, more preferably 100° C. or lower, and yet more preferably 90° C. or lower.

In the present disclosure, the glass transition temperature of a resin is determined from a differential scanning calorimetry curve (DSC curve) obtained by performing differential scanning calorimetry (DSC). More specifically, the glass transition temperature is determined from the "extrapolated glass transition onset temperature" described in the method for determining the glass transition temperature in JIS K 7121:1987 "Testing Methods for Transition Temperatures of Plastics".

The glass transition temperature of a resin is controlled by the types of polymerization components and the polymerization ratios. The glass transition temperature has a tendency to decrease as the density of flexible units, such as a methylene group, an ethylene group, and an oxyethylene group, contained in the main chain increases, and has a tendency to increase as the density of rigid units, such as aromatic rings and cyclohexane rings, contained in the main chain increases. Moreover, the glass transition temperature has a tendency to decrease as the density of aliphatic groups in side chains increases.

From the viewpoint of suppressing fluidization of the composite resin particles in an unpressured state, the mass ratio of styrene relative to the entire composite resin particles is preferably 55 mass % or more, more preferably 60 mass % or more, and yet more preferably 65 mass % or more. From the viewpoint of forming composite resin particles that easily undergo phase transition under pressure, the mass ratio is preferably 80 mass % or less, more preferably 75 mass % or less, and yet more preferably 70 mass % or less.

(Meth)Acrylate Resin

The (meth)acrylate resin contains a (meth)acrylate as a polymerization component.

The (meth)acrylate preferably accounts for 90 mass % or more, preferably 95 mass % or more, more preferably 98 mass % or more, and yet more preferably 100 mass % of all polymerization components of the (meth)acrylate resin.

Examples of the (meth)acrylate include alkyl (meth) acrylates, carboxy-substituted alkyl (meth)acrylates, hydroxy-substituted alkyl (meth)acrylates, alkoxy-substituted alkyl (meth)acrylates, and di(meth)acrylates.

Examples of the alkyl (meth)acrylates include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth) acrylate, lauryl (meth)acrylate, stearyl (meth)acrylate, cyclohexyl (meth)acrylate, dicyclopentanyl (meth)acrylate, and isobornyl (meth)acrylate.

An example of the carboxy-substituted alkyl (meth)acrylates is 2-carboxylethyl (meth)acrylate.

Examples of the hydroxy-substituted alkyl (meth)acrylates include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

An example of the alkoxy-substituted alkyl (meth)acrylates is 2-methoxyethyl (meth)acrylate.

Examples of the di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth) acrylate, nonanediol di(meth)acrylate, and decanediol di(meth)acrylate.

Examples of the (meth)acrylates also include 2-(diethylamino)ethyl (meth)acrylate, benzyl (meth)acrylate, and methoxypolyethylene glycol (meth)acrylate.

These (meth)acrylates may be used alone or in combination.

From the viewpoint of forming composite resin particles that easily undergo phase transition under pressure and exhibit excellent adhesiveness and from the viewpoint of forming a pressure sensitive adhesive that exhibits excellent adhesiveness and releasing properties even when the sheets to be bonded are thin and that less contaminates the pressure bonding apparatus used to bond thin paper sheets, the (meth)acrylate is preferably an alkyl (meth)acrylate, more preferably an alkyl (meth)acrylate in which the alkyl group has 2 or more and 10 or less carbon atoms, more preferably an alkyl (meth)acrylate in which the alkyl group has 4 or more and 8 or less carbon atoms, and particularly preferably n-butyl acrylate and 2-ethylhexyl acrylate. From the viewpoint of forming composite resin particles that easily undergo phase transition under pressure, the styrene resin and the (meth)acrylate resin may contain the same (meth) acrylate as a polymerization component.

From the viewpoint of forming composite resin particles that easily undergo phase transition under pressure and exhibit excellent adhesiveness, the alkyl (meth)acrylate preferably accounts for 90 mass % or more, more preferably 95 mass % or more, yet more preferably 98 mass % or more, and still more preferably 100 mass % of all polymerization components of the (meth)acrylate resin. The (meth)acrylate here is preferably an alkyl (meth)acrylate in which the alkyl group contains 2 or more and 10 or less carbon atoms, and more preferably an alkyl (meth)acrylate in which the alkyl group contains 4 or more and 8 or less carbon atoms.

The (meth)acrylate resin may contain at least two (meth) acrylates as polymerization components.

When the (meth)acrylate resin contains, as polymerization components, at least two (meth)acrylates, from the viewpoint of forming composite resin particles that easily undergo phase transition under pressure and exhibit excellent adhesiveness, the mass ratio of two (meth)acrylates having the largest and second-largest mass ratios among the at least two (meth)acrylates contained as the polymerization components in the (meth)acrylate resin is preferably 80:20 to 20:80, more preferably 70:30 to 30:70, and yet more preferably 60:40 to 40:60.

When the (meth)acrylate resin contains, as polymerization components, at least two (meth)acrylates, the two (meth)acrylates having the largest and second-largest mass ratios among the at least two (meth)acrylates contained as the polymerization components in the (meth)acrylate resin may be alkyl (meth)acrylates. The (meth)acrylate here is preferably an alkyl (meth)acrylate in which the alkyl group contains 2 or more and 10 or less carbon atoms, and more preferably an alkyl (meth)acrylate in which the alkyl group contains 4 or more and 8 or less carbon atoms.

When the (meth)acrylate resin contains, as polymerization components, at least two (meth)acrylates, and the two (meth)acrylates having the largest and second-largest mass ratios among the at least two (meth)acrylates contained as the polymerization components in the (meth)acrylate resin are alkyl (meth)acrylates, the difference in the number of carbon atoms in the alkyl group between these two alkyl (meth)acrylates is, from the viewpoint of forming composite resin particles that easily undergo phase transition under pressure and exhibit excellent adhesiveness, 1 or more and 4 or less, more preferably 2 or more and 4 or less, and yet more preferably 3 or 4.

From the viewpoint of forming composite resin particles that easily undergo phase transition under pressure and exhibit excellent adhesiveness, the (meth)acrylate resin preferably contains, as polymerization components, n-butyl acrylate and 2-ethylhexyl acrylate. In particular, the two (meth)acrylates having the largest and second-largest mass ratios among the at least two (meth)acrylates contained as polymerization components in the (meth)acrylate resin are preferably n-butyl acrylate and 2-ethylhexyl acrylate. The total amount of n-butyl acrylate and 2-ethylhexyl acrylate relative to all polymerization components of the (meth) acrylate resin is preferably 90 mass % or more, more preferably 95 mass % or more, yet more preferably 98 mass % or more, and still more preferably 100 mass %.

The (meth)acrylate resin may further contain, as polymerization components, vinyl monomers other than (meth) acrylates. Examples of the vinyl monomers other than the (meth)acrylates include (meth)acrylic acid; styrene; styrene monomers other than styrene; (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefines such as isoprene, butene, and butadiene. These vinyl monomers may be used alone or in combination.

When the (meth)acrylate resin contains a vinyl monomer other than (meth)acrylates as a polymerization component, the vinyl monomer other than the (meth)acrylates is preferably at least one of acrylic acid and methacrylic acid and is more preferably acrylic acid.

From the viewpoint of suppressing fluidization of the composite resin particles in an unpressured state, the weight average molecular weight of the (meth)acrylate resin is preferably 100,000 or more, more preferably 120,000 or more, and yet more preferably 150,000 or more, and from the viewpoint of forming composite resin particles that easily undergo phase transition under pressure, the weight average molecular weight is preferably 250,000 or less, more preferably 220,000 or less, and yet more preferably 200,000 or less.

From the viewpoint of forming composite resin particles that easily undergo phase transition under pressure, the glass transition temperature of the (meth)acrylate resin is preferably 10° C. or lower, more preferably 0° C. or lower, and yet more preferably −10° C. or lower. From the viewpoint of suppressing fluidization of the composite resin particles in an unpressured state, the glass transition temperature is preferably −90° C. or higher, more preferably −80° C. or higher, and yet more preferably −70° C. or higher.

From the viewpoint of forming composite resin particles that easily undergo phase transition under pressure, the mass ratio of the (meth)acrylate resin relative to the entire composite resin particles is preferably 20 mass % or more, more preferably 25 mass % or more, and yet more preferably 30 mass % or more. From the viewpoint of suppressing fluidization of the composite resin particles in an unpressured state, the mass ratio is preferably 45 mass % or less, more preferably 40 mass % or less, and yet more preferably 35 mass % or less.

The total amount of the styrene resin and the (meth)acrylate resin contained in the composite resin particles relative to the entire composite resin particles is preferably 70 mass % or more, more preferably 80 mass % or more, yet more preferably 90 mass % or more, still preferably 95 mass % or more, and most preferably 100 mass %.

Other Resins

The composite resin particles may contain, for example, polystyrene, and a non-vinyl resin such as an epoxy resin, a polyester resin, a polyurethane resin, a polyamide resin, a cellulose resin, a polyether resin, or modified rosin. These resins may be used alone or in combination.

Mass Ratio of Styrene Resin to (Meth)Acrylate Resin

The mass ratio of the styrene resin to the (meth)acrylate resin (styrene resin:(meth)acrylate resin) is 80:20 to 20:80.

From the viewpoint of forming a pressure sensitive adhesive that exhibits more excellent adhesiveness and releasing properties even when the pressure sensitive adhesive is used to bond thin paper sheets, and that less contaminates the pressure bonding apparatus used in bonding the thin paper sheets, the mass ratio of the styrene resin to the (meth)acrylate resin (styrene resin:(meth)acrylate resin) is preferably 75:25 to 25:75, more preferably 70:30 to 30:70, and yet more preferably 65:35 to 35:65.

Glass Transition Temperature

The difference between the lowest glass transition temperature and the highest glass transition temperature of the composite resin particles is 30° C. or more.

Here, when the composite resin particles that have at least two glass transition temperatures contain a styrene resin and a (meth)acrylate resin, one of the glass transition temperatures is presumed to be that of the styrene resin, and another one of the glass transition temperatures is presumed to be that of the (meth)acrylate resin.

The composite resin particles may have three or more glass transition temperatures; however, the number of glass transition temperatures is preferably two. Examples of the case in which there are two glass transition temperatures include the case in which a styrene resin and a (meth)acrylate resin are the only resins contained in the composite resin particles, and the case in which the amount of resins other than the styrene resin and the (meth)acrylate resin is small (for example, the amount of other resins is 5 mass % or less relative to the entire composite resin particles).

When the composite resin particles have at least two glass transition temperatures and the difference between the lowest glass transition temperature and the highest glass transition temperature is 30° C. or more, from the viewpoint of forming a pressure sensitive adhesive that exhibits more excellent adhesiveness and releasing properties even when the pressure sensitive adhesive is used to bond thin paper sheets, and that less contaminates the pressure bonding apparatus used in bonding the thin paper sheets, the difference between the lowest glass transition temperature and the highest glass transition temperature is more preferably 40° C. or more, yet more preferably 50° C., and still more preferably 60° C. or more. The upper limit of the difference between the lowest glass transition temperature and the highest glass transition temperature is, for example, 140° C. or less, and may be 130° C. or less or 120° C. or less.

From the viewpoint of forming a pressure sensitive adhesive that exhibits more excellent adhesiveness and releasing properties even when the pressure sensitive adhesive is used to bond thin paper sheets, and that less contaminates the pressure bonding apparatus used in bonding the thin paper sheets, the lowest glass transition temperature of the composite resin particles is preferably 10° C. or lower, more preferably 0° C. or lower, and yet more preferably −10° C. or lower. From the viewpoint of suppressing fluidization of the composite resin particles in an unpressured state, the lowest glass transition temperature is preferably −90° C. or higher, more preferably −80° C. or higher, and yet more preferably −70° C. or higher.

From the viewpoint of suppressing fluidization of the composite resin particles in an unpressured state, the highest glass transition temperature of the composite resin particles is preferably 30° C. or higher, more preferably 40° C. or higher, and yet more preferably 50° C. or higher. From the viewpoint of facilitating phase transition of the composite resin particles under pressure, the highest glass transition temperature is preferably 70° C. or lower, more preferably 65° C. or lower, and yet more preferably 60° C. or lower.

In the present disclosure, the glass transition temperatures of the composite resin particles are measured as follows.

A solution containing resin particles to be measured is filtered to recover resin particles. The resin particles are compressed into a plate-shaped sample, and the glass transition temperature is determined from a differential scanning calorimetry curve (DSC curve) obtained by performing differential scanning calorimetry (DSC) on this sample. More specifically, the glass transition temperature is determined from the "extrapolated glass transition onset temperature" described in the method for determining the glass transition temperature in JIS K 7121:1987 "Testing Methods for Transition Temperatures of Plastics".

Melt Viscosity at 100° C.

The melt viscosity of the composite resin particles at 100° C. is 4000 Pa·s or more and 20000 Pa·s or less.

From the viewpoint of forming a pressure sensitive adhesive that exhibits more excellent adhesiveness and releasing properties even when the pressure sensitive adhesive is used to bond thin paper sheets, and that less contaminates the pressure bonding apparatus used in bonding the thin paper sheets, the melt viscosity is preferably 5000 Pa·s or more and 18000 Pa·s or less, more preferably 6000 Pa·s or more and 16000 Pa·s or less, and yet more preferably 7000 Pa·s or more and 14000 Pa·s or less.

The melt viscosity of the composite resin particles is measured as follows.

A solution containing resin particles to be measured is filtered to recover resin particles. Using a Koka-type Flow-tester CFT-500 (produced by Shimadzu Corporation), under the conditions of die aperture diameter of 0.5 mm, an applied load of 0.98 MPa (10 Kg/cm²), and a temperature elevation rate of 1° C./min, the viscosity at a temperature corresponding to ½ of the height from the flow-out onset point to the end point observed when 1 cm³ of the sample (recovered resin particles) is allowed to melt-flow is determined.

Slope of Logarithm of Melt Viscosity of Composite Resin Particles Relative to Temperature In the melt viscosity range of the composite resin particles of 4000 Pa·s or more and 20000 Pa·s or less, the slope of the logarithm of the melt viscosity of the composite resin particles relative to the temperature of the composite resin particles is −0.08 or more and −0.04 or less.

From the viewpoint of forming a pressure sensitive adhesive that exhibits more excellent adhesiveness and releasing properties even when the pressure sensitive adhesive is used to bond thin paper sheets, and that less contaminates the pressure bonding apparatus used in bonding the thin paper sheets, the slope is preferably −0.07 or more and −0.04 or less, more preferably −0.06 or more and −0.04 or less, and yet more preferably −0.06 or more and −0.05 or less.

In the melt viscosity range of the composite resin particles of 4000 Pa·s or more and 20000 Pa·s or less, the slope of the logarithm of the melt viscosity of the composite resin particles relative to the temperature of the composite resin particles is determined as follows.

By the same process as measuring the melt viscosity of the composite resin particles, the viscosity is measured at a temperature corresponding to ½ of the height from the flow-out onset point to the end point. The measurement results are plotted into a graph having a vertical axis indicating the logarithm of the melt viscosity of the composite resin particles (log melt viscosity of composite resin particles) and a horizontal axis indicating the temperature of the composite resin particles. The increment of the logarithm of the melt viscosity of the composite resin particles relative to the increment of the temperature of the composite resin particles (increment of logarithm of melt viscosity of composite resin particles÷increment of temperature of composite resin particles) is calculated, and the obtained value is assumed to be the slope.

Weight Average Molecular Weight of Composite Resin Particles

The weight average molecular weight of the composite resin particles is preferably 50,000 or more and 600,000 or less, more preferably 100,000 or more and 600,000 or less, and yet more preferably 100,000 or more and 500,000 or less.

By setting the weight average molecular weight of the composite resin particles to be within the aforementioned numerical range, the melt viscosity of the composite resin particles is easily optimized. Accordingly, a pressure sensitive adhesive that exhibits more excellent adhesiveness and releasing properties even when the pressure sensitive adhesive is used to bond thin paper sheets, and less contaminates the pressure bonding apparatus used in bonding the thin paper sheets is more easily obtained.

Gel Fraction of Composite Resin Particles

The gel fraction of the composite resin particles is preferably 0.1 mass % or more and 2 mass % or less, more preferably 0.3 mass % or more and 2 mass % or less, and yet more preferably 0.3 mass % or more and 1.5 mass % or less.

The gel fraction is measured as follows.

The gel fraction is measured in accordance with JIS K 6796 (1998).

Specific details are as follows. A solution containing resin particles to be measured is filtered to recover the resin particles, and the resin particles are dried to prepare a measurement sample. The mass of the measurement sample is measured and assumed to be the mass before solvent extraction. Next, the measurement sample is immersed in tetrahydrofuran for 24 hours, the solvent is filtered, the remaining residue is filtered, and the weight is measured. This weight is assumed to be the mass after extraction. Next, the gel fraction is calculated from the following formula:

$$\text{Gel fraction} = 100 \times \frac{(\text{mass after solvent extraction})}{(\text{mass before solvent extraction})} \qquad \text{Formula:}$$

Content of Composite Resin Particles

The content of the composite resin particles relative to the entire pressure sensitive adhesive is preferably 20 mass % or more and 50 mass % or less, more preferably 25 mass % or more and 45 mass % or less, and yet more preferably 30 mass % or more and 40 mass % or less.

When the content of the composite resin particles is within the aforementioned numerical range, the content of the composite resin particles in the pressure sensitive adhesive is sufficient to bond thin paper sheets. Thus, the adhesiveness is further improved.

Volume Average Particle Diameter of Composite Resin Particles

The volume average particle diameter of the composite resin particles is preferably 140 nm or more and 300 nm or less, more preferably 150 nm or more and 280 nm or less, and yet more preferably 160 nm or more and 250 nm or less.

The volume average particle diameter of the composite resin particles is determined by measuring the particle diameter with a laser diffraction particle size distribution meter (for example, LA-700 produced by Horiba Ltd.) and determining the particle diameter at 50% accumulation in a volume-basis particle size distribution calculated from the small diameter side. The result is assumed to be the volume average particle diameter (D50v).

Aqueous Solvent

The pressure sensitive adhesive of the exemplary embodiment contains an aqueous solvent that contains water.

The aqueous solvent is an aqueous solvent containing water. Specifically, the aqueous solvent may contain 50 mass % or more of water relative to the entire aqueous solvent. Examples of the water include distilled water, ion exchange water, ultra-filtrated water, and pure water.

The water content relative to the entire aqueous solvent is preferably 50 mass % or more and 100 mass % or less, more preferably 70 mass % or more and 100 mass % or less, and yet more preferably 80 mass % or more and 100 mass % or less.

The aqueous solvent may contain a solvent other than water.

Examples of the solvent other than water are not limited but include water-soluble organic solvents.

The solvent other than water may be a solvent that does not dissolve the composite resin particles.

Specific examples of the water-soluble organic solvent include water-soluble ether solvents, water-soluble ketone solvents, and water-soluble alcohol solvents.

When a solvent other than water is to be contained, the amount thereof may be small (for example, 40 mass % or less and more preferably 30 mass % or less relative to the entire aqueous solvent). Here, water-soluble means that 1 mass % or more of the target substance dissolves in water at 25° C.

The content of the aqueous solvent relative to the entire pressure sensitive adhesive is preferably 50 mass % or more and 90 mass % or less, more preferably 45 mass % or more and 85 mass % or less, and yet more preferably 40 mass % or more and 80 mass % or less.

Method for Producing Pressure Sensitive Adhesive

A method for producing a pressure sensitive adhesive according to an exemplary embodiment includes a first step of preparing a styrene resin particle dispersion in which styrene resin particles containing a styrene resin are dispersed; and a second step of forming composite resin particles by polymerizing a (meth)acrylate resin in a reaction solution containing the styrene resin particle dispersion, a chain transfer agent, a crosslinking agent, and polymerization components of the (meth)acrylate resin.

First Step

The first step involves preparing a styrene resin particle dispersion in which styrene resin particles containing a styrene resin are dispersed.

The styrene resin particle dispersion is, for example, prepared by dispersing styrene resin particles in a dispersion medium by using a surfactant.

Examples of the dispersion medium are the same solvents as the aforementioned aqueous solvent.

Examples of the surfactant include anionic surfactants such as sulfate esters, sulfonates, phosphate esters, and soaps; cationic surfactants such as amine salts and quaternary ammonium salts; and nonionic surfactants such as polyethylene glycol, alkyl phenol-ethylene oxide adducts, and polyhydric alcohols. A nonionic surfactant may be used in combination with an anionic surfactant or a cationic surfactant. Among these, an anionic surfactant may be used. The surfactants may be used alone or in combination.

Examples of the method for dispersing the styrene resin particles in a dispersion medium include methods that involve mixing a styrene resin and a dispersion medium and then dispersing the resin by stirring in a rotational shear-type homogenizer, or a mill that uses media such as a ball mill, a sand mill, or a dyno mill.

Another example of the method for dispersing styrene resin particles in a dispersion medium is an emulsion polymerization method. Specifically, after polymerization components of a styrene resin, and a chain transfer agent or a polymerization initiator are mixed, an aqueous medium containing a surfactant is added to the resulting mixture, the resulting mixture is stirred to prepare an emulsion, and styrene resin is polymerized in the emulsion. Here, the chain transfer agent may be dodecanethiol.

The volume average particle diameter of the styrene resin particles dispersed in the styrene resin particle dispersion is preferably 100 nm or more and 250 nm or less, more preferably 120 nm or more and 220 nm or less, and yet more preferably 150 nm or more and 200 nm or less.

The volume average particle diameter of resin particles contained in a resin particle dispersion is determined by measuring the particle diameter with a laser diffraction particle size distribution meter (for example, LA-700 produced by Horiba Ltd.) and determining the particle diameter at 50% accumulation in a volume-based particle size distribution calculated from the small diameter side. The result is assumed to be the volume average particle diameter (D50v).

The styrene resin particle content in the styrene resin particle dispersion is preferably 30 mass % or more and 60 mass % or less and is more preferably 40 mass % or more and 50 mass % or less.

Second Step

The second step involves forming composite resin particles by polymerizing a (meth)acrylate resin in a reaction solution containing the styrene resin particle dispersion, a chain transfer agent, a crosslinking agent, and polymerization components of the (meth)acrylate resin.

The composite resin particles may be resin particles containing a styrene resin and a (meth)acrylate resin that are in a microphase-separated state. Such resin particles are produced by, for example, the following method.

To the styrene resin particle dispersion, a chain transfer agent, a crosslinking agent, and the polymerization components of the (meth)acrylate resin are added, and, if necessary, an aqueous medium is added. Next, while slowly stirring the dispersion, the temperature of the dispersion is elevated to a temperature higher than or equal to the glass transition temperature of the styrene resin (for example, a temperature 10° C. to 30° C. higher than the glass transition temperature of the styrene resin). Next, while maintaining the temperature, an aqueous medium containing a polymerization initiator is slowly added dropwise, and then stirring is continued for a long time within the range of 1 to 15 hours. Here, ammonium persulfate may be used as the polymerization initiator.

The detailed mechanism is not clear; however, it is presumed that when the aforementioned method is employed, the monomers and the polymerization initiator penetrate into the styrene resin particles, and polymerization of the (meth)acrylate occurs inside the styrene resin particles. It is presumed that because of this mechanism, composite resin particles in which the (meth)acrylate resin is contained inside the styrene resin particles and in which the styrene resin and the (meth)acrylate resin are in a microphase-separated state inside the particles are obtained.

The volume average particle diameter of the composite resin particles dispersed in the composite resin particle dispersion (in other words, the pressure sensitive adhesive, the same applies hereinafter) is preferably 140 nm or more and 300 nm or less, more preferably 150 nm or more and 280 nm or less, and yet more preferably 160 nm or more and 250 nm or less.

The composite resin particle content in the composite resin particle dispersion is preferably 20 mass % or more and 50 mass % or less and is more preferably 30 mass % or more and 40 mass % or less.

An example of the chain transfer agent is a compound having a thiol group (thiol).

A thiol having a hydrocarbon group having 4 or more and 20 or less carbon atoms may be used as the chain transfer agent.

Examples of the hydrocarbon group contained in the thiol include aliphatic hydrocarbon groups and aromatic hydrocarbon groups.

The hydrocarbon group contained in the thiol may be an aliphatic hydrocarbon group.

The aliphatic hydrocarbon group may be branched or linear.

Specific examples of the chain transfer agent include hexylthiol, heptanethiol, octanethiol, nonanethiol, decanethiol, dodecanethiol, tetradecanethiol, and hexadecanethiol. For example, dodecanethiol may be used.

The crosslinking agent may be at least one monomer selected from the group consisting of difunctional monomers having two ethylenically unsaturated groups and polyfunctional monomers having three or more ethylenically unsaturated groups.

Examples of the ethylenically unsaturated group include functional groups such as a vinyl group, an allyl group, a propargyl group, a butenyl group, an ethynyl group, a phenylethynyl group, a maleimide group, a nadiimide group, and a (meth)acryloyl group. Among these, a (meth)acryloyl group may be used from the viewpoint of reactivity.

The crosslinking agent may a difunctional monomer having two ethylenically unsaturated groups.

Examples of the difunctional monomer having two ethylenically unsaturated groups include aliphatic di(meth) acrylates and aromatic di(meth)acrylates.

Aliphatic di(meth)acrylates are compounds in which two hydrogen atoms in an aliphatic hydrocarbon are substituted with (meth)acryloyl groups.

The aliphatic di(meth)acrylate may have a linear or branched structure or a cyclic structure.

The number of carbon atoms in the aliphatic di(meth) acrylate (excluding the carbon atoms in the (meth)acryloyl groups) is preferably 3 or more and 20 or less, more preferably 5 or more and 15 or less, and yet more preferably 8 or more and 12 or less.

Specific examples of the aliphatic di(meth)acrylate include trimethylolpropane di(meth)acrylate, 1,6-hexanediol di(meth)acrylate, 1,9-nonanediol di(meth)acrylate, and 1,10-decanediol di(meth)acrylate.

Aromatic di(meth)acrylates are compounds that have an aromatic group and two (meth)acryloyl groups.

The aromatic di(meth)acrylate may have a linear or branched structure or a cyclic structure.

The number of carbon atoms in the aromatic di(meth) acrylate (excluding the carbon atoms in the (meth)acryloyl groups) is preferably 3 or more and 20 or less, more preferably 5 or more and 15 or less, and yet more preferably 8 or more and 12 or less.

Specific examples of the aromatic di(meth)acrylate include 2,2-bis(4-(meth)acryloxypolyethoxypolypropoxy-phenyl)propane and bisphenol A diglycidyl ether di(meth) acrylate.

The ratio of the crosslinking agent content to the chain transfer agent content (crosslinking agent content/chain transfer agent content) is preferably 0.1 or more and 1.0 or less, more preferably 0.3 or more and 1.0 or less, and yet more preferably 0.3 or more and 0.8 or less.

Setting the crosslinking agent-to-chain transfer agent content ratio to be within the aforementioned numerical range contributes to optimizing the melt viscosity of the composite resin particles. Thus, the production method can more easily produce a pressure sensitive adhesive that exhibits more excellent adhesiveness and releasing properties even when the pressure sensitive adhesive is used to bond thin paper sheets, and less contaminates the pressure bonding apparatus used in bonding the thin paper sheets.

Through these steps, the pressure sensitive adhesive of the exemplary embodiment is obtained.

Toner for Developing Electrostatic Charge Image

A toner according to an exemplary embodiment may be a toner for developing an electrostatic charge image, the toner containing toner particles obtained by aggregating, fusing, and coalescing the composite resin particles contained in the pressure sensitive adhesive of the exemplary embodiment.

Here, aggregating, fusing, and coalescing the composite resin particles contained in the pressure sensitive adhesive involves, for example, performing a third step and a fourth step in the toner production method described below.

In other words, the toner of this exemplary embodiment may be a toner obtained by a method for producing a toner described below.

The toner according to the exemplary embodiment has a pressure-induced phase transition property, as mentioned above.

The toner contains at least toner particles, and, if needed, an external additive.

Toner Particles

Toner particles are obtained by aggregating, fusing, and coalescing the composite resin particles contained in the pressure sensitive adhesive of the exemplary embodiment.

Volume Average Particle Diameter of Toner Particles

From the viewpoint of handling ease of the toner particles, the volume average particle diameter (D50v) of the toner particles is preferably 4 μm or more, more preferably 5 μm or more, and yet more preferably 6 μm or more, and from the viewpoint of facilitating the phase transition of the entire toner particles under pressure, the volume average particle diameter (D50v) is preferably 12 μm or less, more preferably 10 μm or less, and yet more preferably 9 μm or less.

The volume average particle diameter (D50v) of the toner particles is determined by using Coulter MULTISIZER II (produced by Beckman Coulter Inc.) with an aperture having a diameter of 100 μm. Into 2 mL of a 5 mass % aqueous sodium alkyl benzenesulfonate solution, 0.5 mg or more and 50 mg or less of the toner particles are added and dispersed, and then the resulting dispersion is mixed with 100 mL or more and 150 mL or less of an electrolyte (ISOTON-II produced by Beckman Coulter Inc.). The resulting mixture is dispersed for 1 minute in an ultrasonic disperser, and the obtained dispersion is used as a sample. The particle diameters of 50000 particles having a particle diameter of 2 μm or more and 60 μm or less in the sample are measured. The particle diameter at 50% accumulation in a volume-based particle size distribution calculated from the small diameter side is used as the volume average particle diameter (D50v).

External Additive

An example of the external additive is inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)$ n, $Al_2O_3 \cdot 2SiO_2$, $CaCO_3$, $MgCO_3$, $BaSO_4$, and $MgSO_4$.

The surfaces of the inorganic particles serving as an external additive may be hydrophobized. Hydrophobizing involves, for example, immersing inorganic particles in a hydrophobizing agent. The hydrophobizing agent may be any, and examples thereof include silane coupling agents, silicone oils, titanate coupling agents, and aluminum coupling agents. These agents may be used alone or in combination.

The amount of the hydrophobizing agent is, for example, typically 1 part by mass or more and 10 parts by mass or less relative to 100 parts by mass of the inorganic particles.

Other examples of the external additive include resin particles (resin particles of polystyrene, polymethyl methacrylate (PMMA), melamine resin, etc.), and cleaning activating agents (for example, particles of metal salts of higher aliphatic acids such as zinc stearate and fluorine high-molecular-weight materials).

The externally added amount of the external additive relative to the toner particles is preferably 0.01 mass % or more and 5 mass % or less and is more preferably 0.01 mass % or more and 2.0 mass % or less.

Method for Producing Toner

A method for producing a toner according to an exemplary embodiment includes:

a first step of preparing a styrene resin particle dispersion in which styrene resin particles containing a styrene resin are dispersed;

a second step of forming composite resin particles that contain a styrene resin and a (meth)acrylate resin by polymerizing a (meth)acrylate resin in a reaction solution containing the styrene resin particle dispersion, a chain transfer agent, a crosslinking agent, and polymerization components of the (meth)acrylate resin;

a third step of forming aggregated particles by aggregating the composite resin particles in a composite resin particle dispersion in which the composite resin particles are dispersed; and a fourth step of forming toner particles by heating the aggregated particle dispersion in which the aggregated particles are dispersed, and fusing and coalescing the aggregated particles.

These steps will now be described in detail.

In the description below, a method for obtaining toner particles not containing a coloring agent or a releasing agent is described. A coloring agent, a releasing agent, and other additives may be used as needed. When the toner particles are to contain a coloring agent and a releasing agent, the fourth step is performed after the composite resin particle dispersion, a coloring agent particle dispersion, and a releasing agent particle dispersion are mixed. The coloring agent particle dispersion and the releasing agent particle dispersion are prepared by, for example, mixing raw materials and then dispersing the resulting mixture by using a known disperser machine.

Examples of the coloring agent include various pigments such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and dyes such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

These coloring agents may be used alone or in combination.

Examples of the releasing agent include hydrocarbon wax, natural wax such as carnauba wax, rice wax, and candelilla wax, synthetic or mineral or petroleum wax such as montan wax, and ester wax such as fatty acid ester and montanic acid ester. The releasing agent is not limited to these.

The melting temperature of the releasing agent is preferably 50° C. or higher and 110° C. or lower, and more preferably 60° C. or higher and 100° C. or lower.

The melting temperature is determined from a DSC curve obtained by differential scanning calorimetry (DSC), more specifically, according to "Melting peak temperature" described in the method for determining the melting temperature in JIS K 7121:1987 "Testing Methods for Transition Temperatures of Plastics".

Examples of other additives include those known in the art such as a magnetic material, a charge controller, and inorganic powder. These additives are contained in the toner particles as the internal additive.

Here, the first step and the second step are the same as those in the method for producing a pressure sensitive adhesive described above. Thus, descriptions for the first step and the second step are omitted.

Third Step

The third step involves forming aggregated particles by aggregating the composite resin particles in a composite resin particle dispersion in which the composite resin particles are dispersed.

The composite resin particles are aggregated in the composite resin particle dispersion so as to form aggregated particles having diameters close to the target diameter of the toner particles.

Specifically, for example, after adding an aggregating agent to the composite resin particle dispersion, adjusting the pH of the composite resin particle dispersion to acidic (for example, a pH of 2 or more and 5 or less), and adding a dispersion stabilizer as needed, the resulting mixture is heated to a temperature close to the glass transition temperature of the styrene resin (specifically, for example, a temperature 10° C. to 30° C. lower than the glass transition temperature of the styrene resin) so as to aggregate the composite resin particles and form aggregated particles.

In the aggregated particle forming step, heating may be performed after adding an aggregating agent to the composite resin particle dispersion while stirring the composite resin particle dispersion with a rotational shear-type homogenizer at room temperature (for example, 25° C.), adjusting the pH of the composite resin particle dispersion to acidic (for example, a pH of 2 or more and 5 or less), and adding a dispersion stabilizer as needed.

Examples of the aggregating agent include a surfactant having an opposite polarity to the surfactant contained in the composite resin particle dispersion, an inorganic metal salt, and a divalent or higher valent metal complex. When a metal complex is used as the aggregating agent, the amount of the surfactant used is reduced, and the charge properties are improved.

An additive that forms a complex with a metal ion in the aggregating agent or that forms a similar bond therewith may be used in combination with the aggregating agent as needed. An example of such an additive is a chelating agent.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

A water-soluble chelating agent may be used as the chelating agent. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent added is preferably 0.01 parts by mass or more and 5.0 parts by mass or less and more preferably 0.1 parts by mass or more and less than 3.0 parts by mass relative to 100 parts by mass of the resin particles.

Fourth Step

The fourth step involves forming toner particles by heating the aggregated particle dispersion in which the aggregated particles are dispersed, and fusing and coalescing the aggregated particles.

The aggregated particle dispersion in which the aggregated particles are dispersed is heated to, for example, a temperature equal to or higher than the glass transition temperature of the styrene resin (for example, a temperature 10° C. to 30° C. higher than the glass transition temperature of the styrene resin) to fuse and coalesce the aggregated particles and form toner particles.

The toner particles obtained through the above-described steps usually have a sea-island structure that has a sea phase containing a styrene resin and island phases containing a (meth)acrylate resin and being dispersed in the sea phase. It is presumed that although the styrene resin and the (meth)acrylate resin are in a microphase-separated state in the composite resin particles, the styrene resin gathers to form a sea phase, and the (meth)acrylate resin gathers to form island phases in the fusing and coalescence step.

Toner particles having a core-shell structure are formed through the following steps, for example:

a step of forming second aggregated particles by further mixing the obtained aggregated particle dispersion with a styrene resin particle dispersion and performing aggregation such that styrene resin particles additionally adhere to the surfaces of the aggregated particles; and a step of forming toner particles having a core-shell structure by heating the second aggregated particle dispersion in which the second aggregated particles are dispersed, and fusing and coalescing the second aggregated particles.

The toner particles having a core-shell structure obtained through the aforementioned steps have a shell layer that contains a styrene resin. Instead of the styrene resin particle dispersion, a resin particle dispersion in which a different type of resin particles are dispersed may be used to form a shell layer that contains the different type of resin.

After completion of the fusing and coalescing step, the toner particles formed in the solution are subjected to a washing step, a solid-liquid separation step, and a drying step known in the art so as to obtain dry toner particles. From the viewpoint of chargeability, the washing step may involve thorough displacement washing using ion exchange water. From the viewpoint of productivity, the solid-liquid separation step may involve suction filtration, pressure filtration, or the like. From the viewpoint of productivity, the drying step may involve freeze-drying, flash-drying, fluid-drying, vibration-type fluid-drying, or the like.

The toner is produced by adding an external additive to the obtained dry toner particles and mixing the resulting mixture. Mixing may be performed by using a V blender, a HENSCHEL mixer, a Lodige mixer, or the like. Furthermore, if needed, a vibrating screen, an air screen, or the like may be used to remove coarse particles in the toner.

Bonded Product

A bonded product according to an exemplary embodiment includes a first adherend, a second adherend, and a pressure sensitive adhesive layer formed of the composite resin particles contained in the pressure sensitive adhesive of the exemplary embodiment.

The bonded product may have the pressure sensitive adhesive layer between the first adherend and the second adherend.

Adherend

The adherend is not particularly limited, and examples thereof include paper and films.

The paper may be any paper, for example, regular paper or coated paper.

The film is not particularly limited, and examples thereof include resin films such as polyethylene terephthalate films, polypropylene films, and polyethylene films.

The first adherend and the second adherend may be formed of the same material or different materials. The first adherend and the second adherend may constitute one folded adherend. In such a case, a bonded product may be formed by applying a pressure sensitive adhesive to the adherend and then folding the adherend such that the applied portion comes at the overlapping part of the adherend.

Pressure Sensitive Adhesive Layer

The pressure sensitive adhesive layer is formed of composite resin particles contained in the pressure sensitive adhesive.

Specifically, for example, the pressure sensitive adhesive is applied to the overlapping portion between the first adherend and the second adherend, and then the first and second adherends are stacked on top of each other and pressure-bonded to form the bonded product.

The method for applying the pressure sensitive adhesive is not particularly limited, and any known method capable of applying a liquid substance can be employed. Specific examples of the known method include those methods that use various coaters, such as an air knife coater, a curtain coater, a die coater, a blade coater, a roll coater, a gate roll coater, a bar coater, a rod coater, and a gravure coater, and wire bars.

The method for pressure-bonding the adherend having the pressure sensitive adhesive applied thereto is not particularly limited, and any known method can be employed. The pressure applied to the adherend is preferably 3 MPa or more and 300 MPa or less, more preferably 10 MPa or more and 200 MPa or less, and yet more preferably 30 MPa or more and 150 MPa or less.

Examples of Bonded Product

Specific examples of the bonded product include peelable bonded products such as pressure bonded postcards.

EXAMPLES

Examples will now be described, but these examples do not limit the scope of the present disclosure. In the description below, "parts" and "%" are on a mass basis unless otherwise noted.

Example 1

First step: Preparation of styrene resin particle dispersion

Styrene (as polymerization component): 370 parts n-Butyl acrylate (as polymerization component): 115 parts Acrylic acid (as polymerization component): 15 parts Dodecanethiol (as chain transfer agent): 7.5 parts The above-described materials are mixed and dissolved to prepare a monomer solution (1).

In 205 parts of ion exchange water, 8 parts of an anionic surfactant (DOWFAX 2A1 produced by The Dow Chemical Company) is dissolved, the monomer solution (1) is added thereto, and the resulting mixture is dispersed to obtain an emulsion.

In 462 parts of ion exchange water, 2.2 parts of the aforementioned anionic surfactant is dissolved. The resulting solution is charged into a polymerization flask equipped with a stirrer, a thermometer, a reflux cooling tube, and a nitrogen inlet tube, heated to 73° C. under stirring, and retained thereat. In 21 parts of ion exchange water, 3 parts of ammonium persulfate is dissolved, and the resulting solution is added dropwise to the aforementioned polymerization flask over a period of 15 minutes via a metering pump. Then, the aforementioned emulsion is added dropwise thereto over a period of 160 minutes via a metering pump. Subsequently, while slow stirring is continued, the polymerization flask is retained at 75° C. for 3 hours, and then the temperature is returned to room temperature.

As a result, a styrene resin particle dispersion (St1) that has a volume average particle diameter (D50v) of 175 nm, a weight average molecular weight of 45 k as determined by GPC (UV detection), a glass transition temperature of 53° C., and a solid content of 42% is obtained.

Second step: preparation of pressure sensitive adhesive

Styrene resin particle dispersion (St1): 1190 parts n-Butyl acrylate (as polymerization component): 250 parts 2-Ethylhexyl acrylate (as polymerization component): 150 parts Dodecanethiol (as chain transfer agent): 4 parts 1,10-Decanediol dimethacrylate (DOD-N produced by SHIN-NAKAMURA CHEMICAL CO, LTD., as cross-linking agent): 2 parts Ion exchange water: 982 parts The above-described materials are charged into a polymerization flask to prepare a monomer solution (2). The monomer solution (2) is stirred at 25° C. for 1 hour, and then heated to 70° C. In 75 parts of ion exchange water, 2.5 parts of ammonium persulfate is dissolved, and the resulting solution is added dropwise to the aforementioned polymerization flask over a period of 60 minutes via a metering pump. Subsequently, while slow stirring is continued, the polymerization flask is retained at 70° C. for 3 hours. Thereto, a monomer solution (3) prepared by mixing and dissolving 85 parts of styrene and 15 parts of n-butyl acrylate as polymerization components is added dropwise over a period of 30 minutes, and the resulting mixture is retained for 3 hours and then returned to room temperature. As a result, a pressure sensitive adhesive that contains composite resin particles, has a resin particle volume average particle diameter (D50v) of 220 nm, a weight average molecular weight of 90 k as determined by GPC (UV detection), and a solid content of 32% is obtained.

Examples 2 to 11 and Comparative Examples 1 to 3

Pressure sensitive adhesives are obtained by the same process as in Example 1 except that the compositions of the monomer solution (1), the monomer solution (2), and the monomer solution (3) are changed as indicated in Table 1.

The following features of the composite resin particles obtained in the respective examples are described in the table.

"Mass ratios of polymerization components of styrene resin contained in composite resin particles"

"Mass ratios of polymerization components of (meth) acrylate resin contained in composite resin particles"

"Mass ratio of styrene resin to (meth)acrylate resin contained in composite resin particles (styrene resin:(meth) acrylate resin)"

"Lowest glass transition temperature of composite resin particles (in Table 2, described as "Min Tg (° C.)")"

"Highest glass transition temperature of composite resin particles (in Table 2, described as "Max Tg (° C.)")"

"Melt viscosity of composite resin particles at 100° C. (in Table 2, described as "100° C. melt viscosity (Pa·s)")"

"Slope of logarithm of melt viscosity of composite resin particles relative to temperature of composite resin particles in melt viscosity range of composite resin particles of 4000 Pa·s or more and 20000 Pa·s or less (in Table 2, described as "Slope").

"Weight average molecular weight of composite resin particles"

"Gel fraction of composite resin particles"

"Content of composite resin particles relative to entire pressure sensitive adhesive (in Table 2, described as "Content (mass %)")"

Evaluation of Pressure Sensitive Adhesive

Evaluation of Adhesive Force

A character image is printed on a paper sheet, which is FX C2 paper (basis weight: 82 gsm) cut into a V-fold postcard size, with an electrophotographic printer. Each of the pressure sensitive adhesives obtained in the respective examples is applied to the entire surface of the paper sheet with a bar coater at an application amount of 2 g/m². Subsequently, after the pressure sensitive adhesive is fixed to the paper sheet and dried by using a fixing bench of a multifunction apparatus, the paper sheet is folded in two. The folded paper sheet is passed through a sealer (Pressle multi 2 produced by Toppan Forms Co., Ltd.) to be pressed (Gap 10, pressure: 90 MPa), left to stand overnight, and cut into a width of 15 mm to prepare a test piece. The 90 degree peel test is performed on this test piece.

The peeling speed of the 90 degree peel test is set to 20 mm/min, the load (N) from 10 mm to 50 mm after start of measurement is sampled at 0.4 mm intervals, and the results are averaged. The load (N) required for peeling is categorized as follows in evaluating the adhesive force. The rating C indicates insufficient adhesive force and failure to reach the target value. Evaluation results are indicated in Table 2.

A: 0.8 N or more

B: 0.4 N or more but less than 0.8 N

C: less than 0.4 N

Evaluation of Property of Suppressing Tearing of Paper Sheets

A paper sheet pressurized by a sealer as in evaluating the adhesive force is stored in a 30° C., 90% RH chamber for a week, and then the bonded portion is manually peeled to evaluate whether tearing is found in the paper sheet according to the following evaluation standard. Evaluation results are indicated in Table 2.

A: No tearing

B: Minor tearing found in paper sheet (image remains intact)

C: Major tearing found in paper sheet (tearing found even in image portion)

Parts Contamination Evaluation

After evaluating the adhesive force, the portion of the sealer (Pressle multi 2 produced by Toppan Forms Co., Ltd.) where the sealer adheres to the paper sheet is observed with naked eye, and the parts contamination is evaluated on the basis of the following standard. Evaluation results are indicated in Table 2.

A: No contamination

B: Minor contamination found

C: Contamination found in all parts

Example 101

A toner is prepared by the following process by using the pressure sensitive adhesive obtained in Example 1.

Preparation of Toner

Pressure sensitive adhesive obtained in example 1: 504 parts

Ion exchange water: 710 parts

Anionic surfactant (DOWFAX 2A1 produced by The Dow Chemical Company): 1 part

The above-described materials are placed in a reactor equipped with a thermometer and a pH meter, and the pH is adjusted to 3.0 by adding a 1.0% aqueous nitric acid solution at a temperature of 25° C. Then, while the resulting mixture is dispersed in a homogenizer (ULTRA-TURRAX T50 produced by IKA Japan) at a rotation rate of 5000 rpm, 23 parts of a 2.0% aqueous aluminum sulfate solution is added. Subsequently, a stirrer and a heating mantle are attached to the reactor. The temperature is elevated at a temperature elevation rate of 0.2° C./min up to a temperature of 40° C. and then at 0.05° C./min beyond 40° C. The particle diameter is measured every 10 minutes with MULTISIZER II (aperture diameter: 50 μm, produced by Beckman Coulter Inc.). The temperature is retained when the volume average particle diameter reached 5.0 μm, and 170 parts of the styrene resin particle dispersion (St1) is added thereto over a period of 5 minutes. After completion of addition, a temperature of 50° C. is held for 30 minutes, a 1.0% aqueous sodium hydroxide solution is added thereto, and the pH of the slurry is adjusted to 6.0. Subsequently, while the pH is adjusted to 6.0 every 5° C., the temperature is elevated at a temperature elevation rate of 1° C./min up to 90° C., and the temperature is retained at 90° C. The particle shape and the surface property are observed with an optical microscope and a field emission-type scanning electron microscope (FE-SEM), and coalescence of particles is confirmed at the 10th hour. The reactor is then cooled with cooling water over a period of 5 minutes to 30° C.

The cooled slurry is passed through a nylon mesh having 15 μm opening to remove coarse particles, and the slurry that has passed through the mesh is filtered at a reduced pressure by using an aspirator. The solid matter remaining on the paper filter is manually pulverized as finely as possible and is added to ion exchange water (temperature: 30° C.) in an amount ten times the amount of the solid matter. The resulting mixture is stirred for 30 minutes. Subsequently, the solid matter remaining on the paper filter after filtration at a reduced pressure in an aspirator is pulverized manually as finely as possible and is added to ion exchange water (temperature: 30° C.) in an amount ten times the amount of the solid matter. The resulting mixture is stirred for 30 minutes and is again filtered at a reduced pressure with an aspirator. The electrical conductivity of the filtrate is measured. This operation is repeated until the electrical conductivity of the filtrate is 10 μS/cm or less so as to wash the solid matter.

The washed solid matter is finely pulverized in a wet-dry-type particle sizer (Comil) and then vacuum-dried in an oven at 25° C. for 36 hours. As a result, toner particles are obtained. The toner particles have a volume average particle diameter of 8.0 μm.

One hundred parts of the toner particles and 1.5 parts of hydrophobic silica (RY50 produced by Nippon Aerosil Co., Ltd.) are mixed, and the resulting mixture is mixed in a sample mill at 13000 rpm for 30 seconds. The mixture is then screened through a vibrating screen having 45 μm openings. As a result, a toner is obtained.

Evaluation of Toner

Evaluation of Tack Strength

A printed matter production apparatus equipped with an intermediate transfer-type printing unit (specifically, an electrophotographic printer) that applies a toner to a recording medium and a pressure bonding unit that has a folding device and a pressurizing device is prepared as the apparatus for producing a printed matter. By using the toners obtained in the respective examples, developers for this printed matter production apparatus are prepared, and placed in developing devices of the printing units.

A sheet of FX C2 paper (basis weight: 82 gsm) is cut into a V-fold postcard size, and a character image is printed thereon to prepare a recording medium.

The toner application amount obtained in Example 101 is 3 g/m$^2$ in the image formed region of the image formed surface of the postcard sheet.

The folding device is a device that folds the postcard sheet in two such that the image-formed surface comes on the inner side.

The pressurizing device is to apply a pressure of 90 MPa.

By using the aforementioned apparatus under the aforementioned conditions, ten postcards, each of which is folded in two and bonded such that the image-formed surface comes on the inner side and opposing flaps of the image-formed surface are bonded to each other, are continuously produced.

The tenth postcard is cut in the long side direction at a width of 15 mm to prepare a rectangular test piece, and the test piece is subjected to the 90 degree peel test. The peeling speed of the 90 degree peel test is set to 20 mm/min, the load (N) from 10 mm to 50 mm is sampled at 0.4 mm intervals after start of the measurement, the results are averaged, and the loads (N) observed from three test pieces are averaged. The tack strength of the toner is evaluated by the same evaluation standards as the adhesive force evaluation in the evaluation of the pressure sensitive adhesive described above. The evaluation has found that the load needed to peel is 0.9 N, and excellent adhesive force is exhibited (evaluation: A). In addition, the property of the toner of suppressing tearing of paper sheets is evaluated by the same evaluation standard as the evaluation of the property of suppressing tearing of paper sheets in evaluation of the pressure sensitive adhesive described above. The evaluation has found that the releasing properties are excellent (evaluation: A). After the postcards are prepared, the portion of the pressurizing device that comes into contact with the paper sheet is observed with naked eye, and the parts contamination by the toner is evaluated on the basis of the same evaluation standards as the parts contamination evaluation for the pressure sensitive adhesive described above. No contamination by adherence of the toner is found (evaluation: A).

Examples 102 to 105

Toners are prepared by the same method as in Example 101 by using the pressure sensitive adhesives obtained in Examples 2 to 5. The results are indicated in Table 3.

TABLE 1

| | Type of styrene resin particle dispersion | First step Composition of monomer solution (1) | | | Second step Composition of monomer solution (2) | | |
|---|---|---|---|---|---|---|---|
| | | Polymer components (type of monomer/parts) | | Chain transfer agent (type/parts) | Styrene resin particle dispersion (type/parts) | Polymerization components (monomer type/parts) | |
| Example 1 | St1 | St/370 | BA/115 AA/15 | DT/7.5 | St1/1190 | BA/250 | 2EHA/150 |
| Example 2 | St1 | St/370 | BA/115 AA/15 | DT/7.5 | St1/1190 | BA/250 | 2EHA/150 |
| Example 3 | St1 | St/370 | BA/115 AA/15 | DT/7.5 | St1/1190 | BA/250 | 2EHA/150 |
| Example 4 | St1 | St/370 | BA/115 AA/15 | DT/7.5 | St1/1595 | BA/144 | 2EHA/86 |
| Example 5 | St1 | St/370 | BA/115 AA/15 | DT/7.5 | St1/405 | BA/488 | 2EHA/293 |
| Comparative Example 1 | St1 | St/370 | BA/115 AA/15 | DT/7.5 | St1/1190 | BA/250 | 2EHA/150 |
| Comparative Example 2 | St1 | St/370 | BA/115 AA/15 | DT/7.5 | St1/1190 | BA/250 | 2EHA/150 |
| Comparative Example 3 | St1 | St/370 | BA/115 AA/15 | DT/7.5 | St1/1737 | BA/106 | 2EHA/64 |
| Example 6 | St1 | St/370 | BA/115 AA/15 | DT/7.5 | St1/1190 | BA/250 | 2EHA/150 |
| Example 7 | St1 | St/370 | BA/115 AA/15 | DT/7.5 | St1/1190 | BA/250 | 2EHA/150 |
| Example 8 | St1 | St/370 | BA/115 AA/15 | DT/7.5 | St1/1190 | BA/250 | 2EHA/150 |
| Example 9 | St1 | St/370 | BA/115 AA/15 | DT/7.5 | St1/1190 | BA/250 | 2EHA/150 |
| Example 10 | St1 | St/370 | BA/115 AA/15 | DT/7.5 | St1/1190 | BA/250 | EA/150 |
| Example 11 | St1 | St/370 | BA/115 AA/15 | DT/7.5 | St1/1190 | HA/250 | 2EHA/150 |

| | Second step | | | | | Composition of monomer solution (3) | |
|---|---|---|---|---|---|---|---|
| | Composition of monomer solution (2) | | | | | Polymer components (monomer type/parts) | |
| | Chain transfer agent (type/parts) | Crosslinking agent (type/parts) | Ion exchange water (parts) | (Crosslinking agent content/ chain transfer agent content) | | | |
| Example 1 | DT/4 | DOD-N/2 | 982 | 0.5 | | St/85 | BA/15 |
| Example 2 | DT/4 | DOD-N/1.2 | 982 | 0.3 | | St/85 | BA/15 |
| Example 3 | DT/1.2 | DOD-N/0.96 | 982 | 0.8 | | St/85 | BA/15 |
| Example 4 | DT/2.4 | DOD-N/1.2 | 565 | 0.5 | | St/85 | BA/15 |
| Example 5 | DT/7.8 | DOD-N/3.9 | 1915 | 0.5 | | St/43 | BA/7 |
| Comparative Example 1 | DT/12 | DOD-N/0.96 | 982 | 0.5 | | St/85 | BA/15 |
| Comparative Example 2 | DT/0.8 | DOD-N/4 | 982 | 5 | | St/85 | BA/15 |
| Comparative Example 3 | DT/1.7 | DOD-N/3.4 | 982 | 0.5 | | St/85 | BA/15 |
| Example 6 | DT/1.2 | DOD-N/1.2 | 982 | 1 | | St/85 | BA/15 |
| Example 7 | DT/1.2 | DOD-N/1.08 | 982 | 0.9 | | St/85 | BA/15 |
| Example 8 | DT/4 | DOD-N/0.4 | 982 | 0.1 | | St/85 | BA/15 |
| Example 9 | DT/4 | DOD-N/0.8 | 982 | 0.2 | | St/85 | BA/15 |
| Example 10 | DT/4 | DOD-N/2 | 982 | 0.5 | | St/85 | BA/15 |
| Example 11 | DT/4 | DOD-N/2 | 982 | 0.5 | | St/85 | BA/15 |

TABLE 2

| | Composite resin particles | | | | | |
|---|---|---|---|---|---|---|
| | Mass ratios of polymerization components of styrene resin | Mass ratios of polymerization components of (meth)acrylate resin | Mass ratio (styrene resin/(meth) acrylate resin) | Min Tg (° C.) | Max Tg (° C.) | 100° C. melt viscosity (Pa · s) |
| Example 1 | St/BA/AA = 74/23/3 | 2EHA/BA = 38/62 | 60/40 | −50 | 53 | 9200 |
| Example 2 | St/BA/AA = 74/23/3 | 2EHA/BA = 38/62 | 60/40 | −50 | 53 | 4150 |
| Example 3 | St/BA/AA = 74/23/3 | 2EHA/BA = 38/62 | 60/40 | −50 | 53 | 19200 |
| Example 4 | St/BA/AA = 74/23/3 | 2EHA/BA = 38/62 | 77/23 | −50 | 53 | 5200 |
| Example 5 | St/BA/AA = 74/23/3 | 2EHA/BA = 38/62 | 22/78 | −50 | 53 | 15000 |
| Comparative Example 1 | St/BA/AA = 74/23/3 | 2EHA/BA = 38/62 | 60/40 | −50 | 53 | 3630 |
| Comparative Example 2 | St/BA/AA = 74/23/3 | 2EHA/BA = 38/62 | 60/40 | −50 | 53 | 23000 |
| Comparative Example 3 | St/BA/AA = 74/23/3 | 2EHA/BA = 38/62 | 83/17 | −50 | 53 | 4200 |

TABLE 2-continued

| Example 6 | St/BA/AA = 74/23/3 | 2EHA/BA = 38/62 | 60/40 | −50 | 53 | 20000 |
| Example 7 | St/BA/AA = 74/23/3 | 2EHA/BA = 38/62 | 60/40 | −50 | 53 | 19000 |
| Example 8 | St/BA/AA = 74/23/3 | 2EHA/BA = 38/62 | 60/40 | −50 | 53 | 4150 |
| Example 9 | St/BA/AA = 74/23/3 | 2EHA/BA = 38/62 | 60/40 | −50 | 53 | 4150 |
| Example 10 | St/BA/AA = 74/23/3 | EA/BA = 38/62 | 60/40 | −40 | 53 | 9200 |
| Example 11 | St/BA/AA = 74/23/3 | 2EHA/HA = 38/62 | 60/40 | −50 | 53 | 9200 |

| | | Composite resin particles | | | Evaluation | |
| --- | --- | --- | --- | --- | --- | --- |
| | Slope | Weight average molecular weight | Gel fraction (%) | Adhesive force | Property of suppressing tearing of paper sheets | Parts contamination |
| Example 1 | −0.05 | 300,000 | 1.0 | A | A | A |
| Example 2 | −0.08 | 100,000 | 0.3 | B | A | A |
| Example 3 | −0.04 | 500,000 | 1.8 | A | B | A |
| Example 4 | −0.05 | 150,000 | 1.0 | B | A | A |
| Example 5 | −0.05 | 400,000 | 1.3 | B | B | A |
| Comparative Example 1 | −0.09 | 30,000 | 1.0 | C | A | C |
| Comparative Example 2 | −0.03 | 700,000 | 5.0 | A | C | C |
| Comparative Example 3 | −0.05 | 100,000 | 0.9 | C | A | A |
| Example 6 | −0.04 | 590,000 | 2.0 | A | B | A |
| Example 7 | −0.04 | 550,000 | 1.9 | A | B | A |
| Example 8 | −0.08 | 50,000 | 0.1 | B | A | A |
| Example 9 | −0.08 | 70,000 | 0.2 | B | A | A |
| Example 10 | −0.05 | 300,000 | 1.0 | B | A | A |
| Example 11 | −0.05 | 300,000 | 1.0 | A | A | A |

TABLE 3

| | Type of pressure sensitive adhesive | Toner particle volume average particle diameter | Evaluation of adhesive force | Evaluation of property of suppressing tearing of paper sheets | Evaluation of parts contamination |
| --- | --- | --- | --- | --- | --- |
| Example 101 | Pressure sensitive adhesive of Example 1 | 8 μm | A 0.9N | A | A |
| Example 102 | Pressure sensitive adhesive of Example 2 | 8 μm | B 0.6N | A | A |
| Example 103 | Pressure sensitive adhesive of Example 3 | 8 μm | A 0.95N | B | A |
| Example 104 | Pressure sensitive adhesive of Example 4 | 8 μm | B 0.65N | A | A |
| Example 105 | Pressure sensitive adhesive of Example 5 | 8 μm | B 0.75N | B | A |

Abbreviations in the tables are as follows.

St: styrene

BA: n-butyl acrylate

AA: acrylic acid

DT: dodecanethiol

2EHA: 2-ethylhexyl acrylate

DOD-N: 1,10-decanediol dimethacrylate

EA: ethyl acrylate

HA: hexyl acrylate

The above-described results indicate that the pressure sensitive adhesives and the toners of Examples exhibit excellent adhesiveness and releasing properties even when used to bond thin recording media, and less contaminate the pressure bonding apparatus used in bonding the thin recording media.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A pressure sensitive adhesive comprising:

i) composite resin particles that contain, in a polymerized form:

a styrene resin containing, as polymerization components, styrene, butyl acrylate, and acrylic acid, a (meth)acrylate resin containing, as polymerization components, di(meth)acrylate, butyl acrylate, 2-ethylhexyl acrylate, and styrene, and a chain transfer agent, and ii) an aqueous solvent containing water;

wherein:

a mass ratio of the styrene resin to the (meth)acrylate resin (styrene resin:(meth)acrylate resin) is 80:20 to 20:80, a difference between the lowest glass transition temperature and the highest glass transition temperature of the composite resin particles is 30° C. or more, a melt viscosity of the composite resin particles at 100° C. is 4000 Pa·s or more and 20000 Pa·s or less, in a melt viscosity range of the composite resin particles of 4000 Pa·s or more and 20000 Pa·s or less, a slope of a logarithm of the melt viscosity of the composite resin particles relative to a temperature of the composite resin particles is −0.08 or more and −0.04 or less, the composite resin particles have a gel fraction of 0.1 mass % or more and 2 mass % or less, a ratio of a content of the di(meth)acrylate to a content of the chain transfer agent in the methacrylate resin of the composite resin particles is from 0.1 to 1.0, and the chain transfer agent comprises at least one selected from the group consisting of hexylthiol, heptanethiol, octanethiol, nonanethiol, decanethiol, dodecanethiol, tetradecanethiol, and hexadecanethiol.

2. The pressure sensitive adhesive according to claim 1, wherein the composite resin particles have a weight average molecular weight of 50,000 or more and 600,000 or less.

3. The pressure sensitive adhesive according to claim 1, wherein the di(meth)acrylate includes a 1,10-Decanediol dimethacrylate.

4. A toner for developing an electrostatic charge image, the toner comprising:

toner particles obtained by aggregating, fusing, and coalescing the composite resin particles contained in the pressure sensitive adhesive according to claim 1.

5. A bonded product comprising:

a first adherend;

a second adherend; and a pressure sensitive adhesive layer formed of the composite resin particles contained in the pressure sensitive adhesive according to claim 1.

6. A method for producing the pressure sensitive adhesive according to claim 1, the method comprising:

preparing a styrene resin particle dispersion in which styrene resin particles containing the styrene resin are dispersed, wherein the styrene resin contains, as polymerization components, styrene, butyl acrylate, and acrylic acid; and forming composite resin particles by polymerizing, polymerization components of the (meth)acrylate resin, comprising dimethacrylate, butyl acrylate, 2-ethylhexyl acrylate and styrene, in a reaction solution containing the styrene resin particle dispersion and the chain transfer agent;

wherein a mass ratio of the styrene resin to the (meth) acrylate resin (styrene resin:(meth)acrylate resin) is 80:20 to 20:80;

wherein a ratio of a content of the dimethacrylate to a content of the chain transfer agent in the methacrylate resin of the composite resin particles is from 0.1 to 1.0; and wherein the chain transfer agent comprises at least one selected from the group consisting of hexylthiol, heptanethiol, octanethiol, nonanethiol, decanethiol, dodecanethiol, tetradecanethiol, and hexadecanethiol.

* * * * *